United States Patent
Hatada

(10) Patent No.: US 10,120,170 B2
(45) Date of Patent: Nov. 6, 2018

(54) ZOOM LENS AND IMAGE PICKUP APPARATUS INCLUDING THE SAME

(71) Applicant: CANON KABUSHIKI KAISHA, Tokyo (JP)

(72) Inventor: Takahiro Hatada, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/829,011

(22) Filed: Aug. 18, 2015

(65) Prior Publication Data

US 2016/0062096 A1 Mar. 3, 2016

(30) Foreign Application Priority Data

Aug. 28, 2014 (JP) .................. 2014-173918

(51) Int. Cl.
*G02B 15/173* (2006.01)
*G02B 15/14* (2006.01)
(Continued)

(52) U.S. Cl.
CPC ........... *G02B 15/173* (2013.01); *G02B 15/14* (2013.01); *G02B 27/0025* (2013.01); *H04N 5/23212* (2013.01)

(58) Field of Classification Search
CPC .... G02B 15/173; G02B 13/009; G02B 15/14; G02B 15/15; H04N 5/23212
(Continued)

(56) References Cited

U.S. PATENT DOCUMENTS 7,286,300 B2 * 10/2007 Kuroda ................ G02B 15/173
359/676
7,982,970 B2 * 7/2011 Wada ................... G02B 15/173
348/240.99
(Continued)

FOREIGN PATENT DOCUMENTS

CN 102576146 A 7/2012
CN 103217787 A 7/2013
(Continued)

OTHER PUBLICATIONS

Japanese Office Action dated Jan. 10, 2017, in connection with related Japanese Patent Application No. 2014173918, together with English translation, 8 pages.
(Continued)

*Primary Examiner* — Jordan Schwartz
(74) *Attorney, Agent, or Firm* — Carter, DeLuca, Farrell & Schmidt, LLP

(57) ABSTRACT

Provided is a zoom lens, including, in order from an object side to an image side: a first lens unit having a positive refractive power; a second lens unit having a negative refractive power; and a rear unit including a plurality of lens units and having a positive refractive power as a whole, in which an interval between adjacent lens units is changed during zooming. The rear unit includes a focus unit having a positive refractive power, which is configured to move during focusing. An optical system arranged on the image side of the focus unit has a negative refractive power at a telephoto end. A focal length (ft) of the zoom lens at the telephoto end and a combined focal length (fpt) of an optical system arranged on the object side of the focus unit are each appropriately set.

23 Claims, 10 Drawing Sheets

(51) Int. Cl.
*H04N 5/232* (2006.01)
*G02B 27/00* (2006.01)

(58) Field of Classification Search
USPC .................. 359/676, 683, 684, 686, 687
See application file for complete search history.

(56) References Cited

U.S. PATENT DOCUMENTS

| | | | | |
|---|---|---|---|---|
| 2010/0033839 | A1* | 2/2010 | Fujisaki | G02B 15/20 |
| | | | | 359/687 |
| 2011/0002045 | A1* | 1/2011 | Li | G02B 15/173 |
| | | | | 359/683 |
| 2012/0013995 | A1* | 1/2012 | Saruwatari | G02B 15/173 |
| | | | | 359/687 |
| 2012/0154524 | A1 | 6/2012 | Matsumura et al. | |
| 2013/0188088 | A1* | 7/2013 | Miyatani | G02B 15/173 |
| | | | | 348/340 |
| 2015/0085153 | A1* | 3/2015 | Souma | G02B 27/0062 |
| | | | | 348/220.1 |
| 2015/0124127 | A1* | 5/2015 | Iwashita | G02B 13/009 |
| | | | | 348/240.3 |
| 2016/0195703 | A1* | 7/2016 | Tashiro | G02B 15/173 |
| | | | | 359/683 |

FOREIGN PATENT DOCUMENTS

| | | |
|---|---|---|
| JP | H04-60509 A | 2/1992 |
| JP | H06-109976 A | 4/1994 |
| JP | H06-331891 A | 12/1994 |
| JP | 2003-255228 A | 9/2003 |
| JP | 2004-354869 A | 12/2004 |
| JP | 2005-292338 A | 10/2005 |
| JP | 2011-013536 A | 1/2011 |
| JP | 2011-237832 A | 11/2011 |
| JP | 2012-078788 A | 4/2012 |
| JP | 2014-137409 A | 7/2014 |
| WO | 2014013648 A1 | 1/2014 |

OTHER PUBLICATIONS

Chinese Office Action dated Apr. 26, 2017 in corresponding Chinese Patent Application No. 201510534870.1 together with English translation, 25 pages.

* cited by examiner

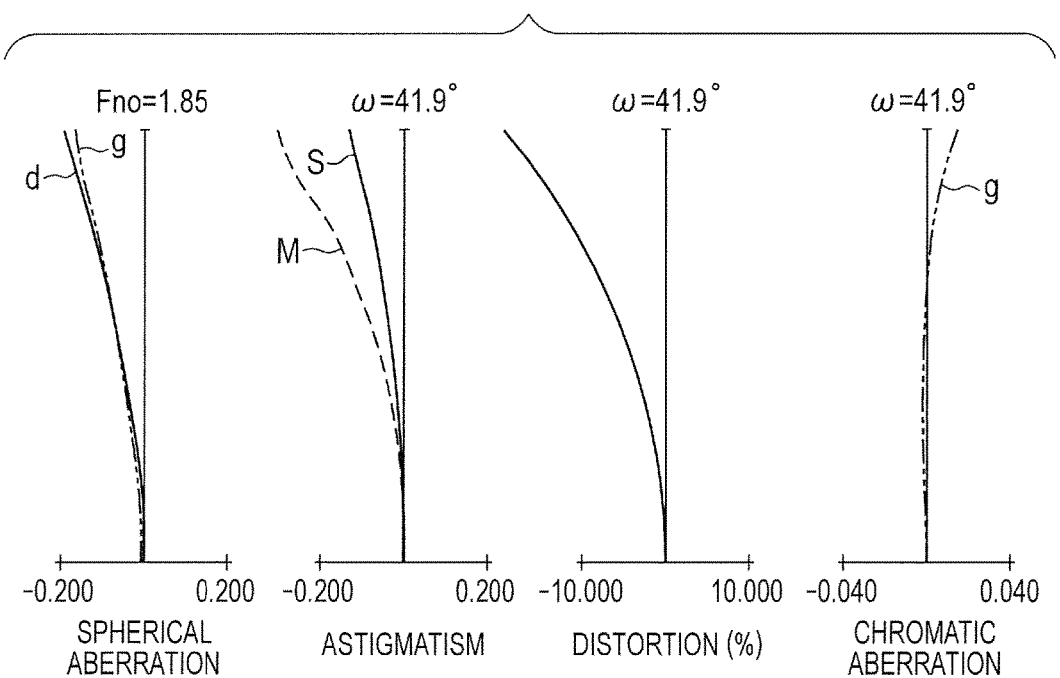
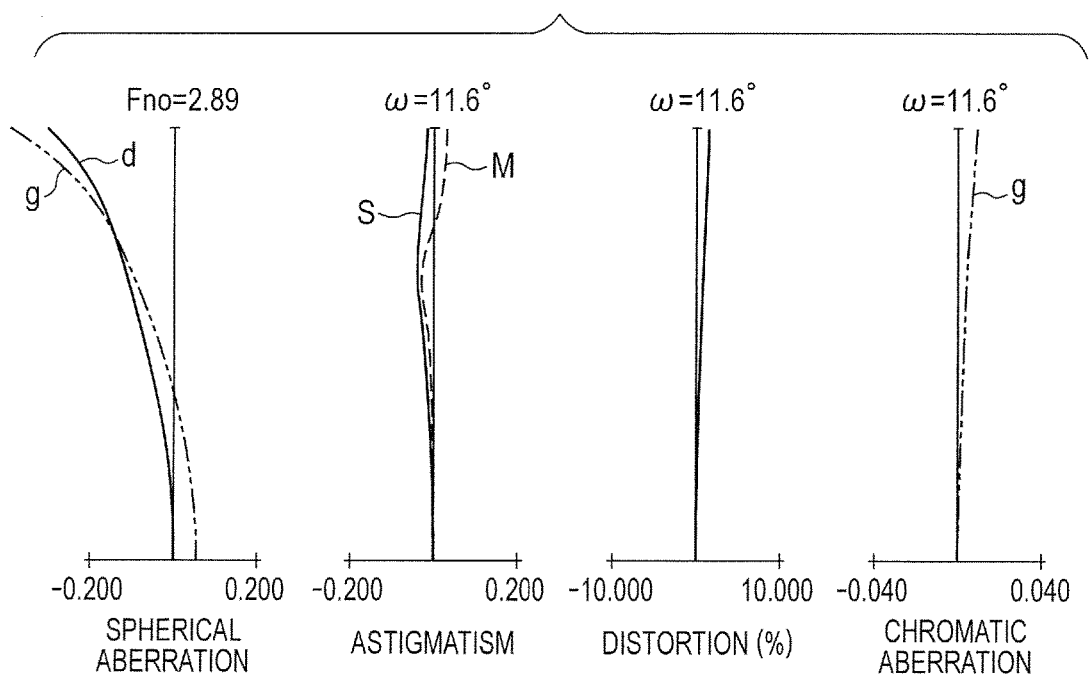

ZOOM LENS AND IMAGE PICKUP APPARATUS INCLUDING THE SAME

BACKGROUND OF THE INVENTION

Field of the Invention

The present invention relates to a zoom lens and an image pickup apparatus including the zoom lens, which are suitable for an image pickup optical system of an image pickup apparatus, such as a video camera, a digital still camera, a film camera, a broadcasting camera, or a monitoring camera.

Description of the Related Art

In recent years, as an image pickup optical system used for an image pickup apparatus, there is a demand for a zoom lens having a high aperture ratio, a high zoom ratio, and a high optical characteristic over an entire object distance from infinity to close distance.

In the related art, as a focusing method of a zoom lens, there have been known a so-called front lens focus system in which a first lens unit arranged closest to an object side is moved, and a so-called inner focus system (rear focus system) in which lenses arranged on an image side of a first lens unit are moved. In general, a zoom lens using the inner focus system has a smaller beam effective diameter of the first lens unit than that of a zoom lens using the front lens focus system, and hence is easy to downsize the entire lens system. In addition, a lens unit that is relatively small in size and weight is moved to perform focusing, and hence it is easy to realize an increase in speed of the focusing.

In the related art, there has been known the zoom lens using the inner focus system. In each of Japanese Patent Application Laid-Open No. 2005-292338 and Japanese Patent Application Laid-Open No. 2012-78788, there is disclosed a zoom lens including, in order from an object side to an image side, a first lens unit to a fifth lens unit having positive, negative, positive, positive, and negative refractive powers, in which each of the lens units is moved during zooming, and the fourth lens unit is moved during focusing. In addition, in Japanese Patent Application Laid-Open No. 2003-255228, there is disclosed a zoom lens including, in order from an object side to an image side, a first lens unit to a fifth lens unit having positive, negative, positive, negative, and positive refractive powers, in which each of the lens units is moved during zooming, and the fifth lens unit is moved during focusing.

In order to realize the increase in speed of the focusing in the zoom lens using the inner focus system, it is important to appropriately set the refractive power of each of the lens units forming the zoom lens and a refractive power of a focus unit.

SUMMARY OF THE INVENTION

According to one embodiment of the present invention, there is provided a zoom lens, including, in order from an object side to an image side: a first lens unit having a positive refractive power; a second lens unit having a negative refractive power; and a rear unit including a plurality of lens units and having a positive refractive power as a whole. In the zoom lens, an interval between adjacent lens units is changed during zooming. The rear unit includes a focus unit having a positive refractive power, which is configured to move during focusing. An optical system arranged on the image side of the focus unit has a negative refractive power at a telephoto end. The following conditional expression is satisfied:

$2.0 < |fpt/ft|$, where ft represents a focal length of the zoom lens at the telephoto end, and fpt represents a combined focal length of an optical system arranged on the object side of the focus unit.

Further features of the present invention will become apparent from the following description of exemplary embodiments with reference to the attached drawings.

BRIEF DESCRIPTION OF THE DRAWINGS

FIG. 3A is a longitudinal aberration diagram when the focusing is made on an object distance of 0.10 m at the wide angle end of the zoom lens of Example 1.

FIG. 3B is a longitudinal aberration diagram when the focusing is made on an object distance of 0.50 m at the telephoto end of the zoom lens of Example 1.

DESCRIPTION OF THE EMBODIMENTS

Now, exemplary embodiments of the present invention are described in detail with reference to the accompanying drawings. A zoom lens of the present invention includes, in order from an object side to an image side: a first lens unit having a positive refractive power; a second lens unit having a negative refractive power; and a rear unit including a plurality of lens units and having a positive refractive power as a whole. An interval between adjacent lens units is changed during zooming. The rear unit includes a focus unit configured to move during focusing. An entire optical system LBB arranged on the image side of the focus unit has a negative refractive power at a telephoto end.

Figure 1:
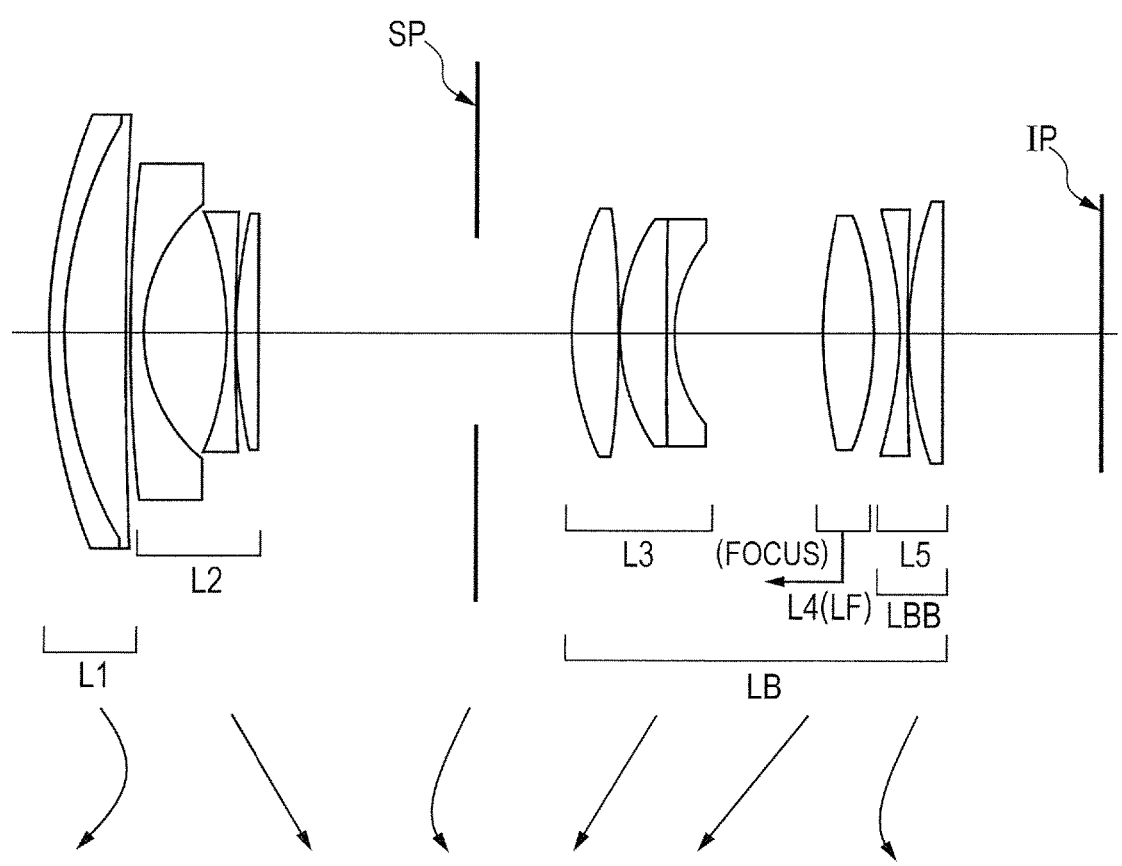
FIG. 1 is a lens cross-sectional view when focusing is made on an infinity object at a wide angle end of a zoom lens according to Example 1 of the present invention.
Figure 2A:
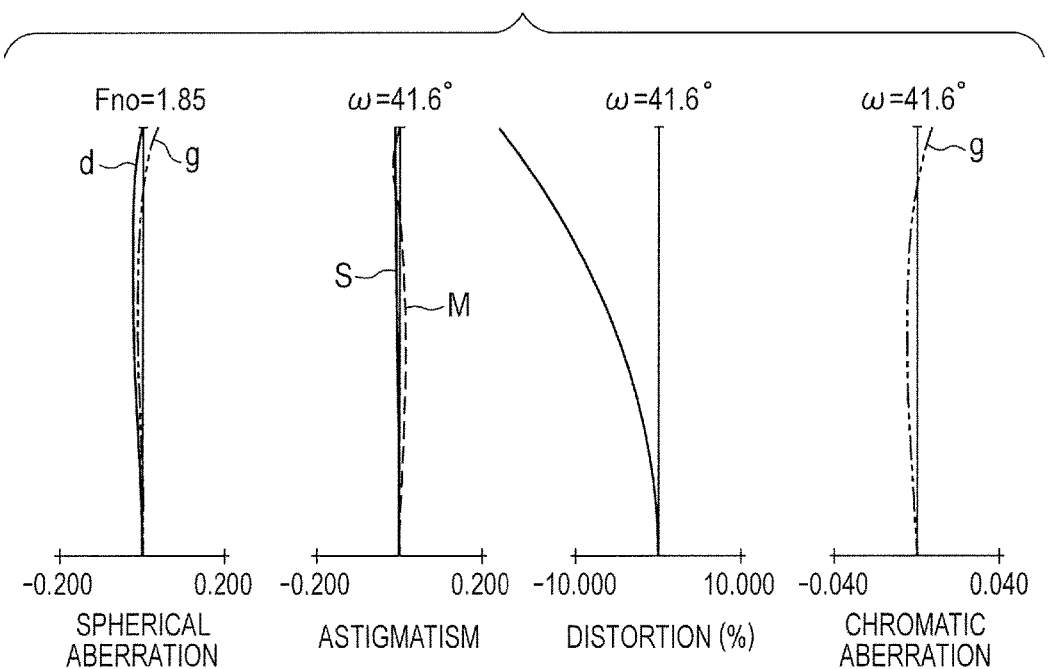
FIG. 2A is a longitudinal aberration diagram when the focusing is made on the infinity object at the wide angle end of the zoom lens of Example 1.
Figure 2B:
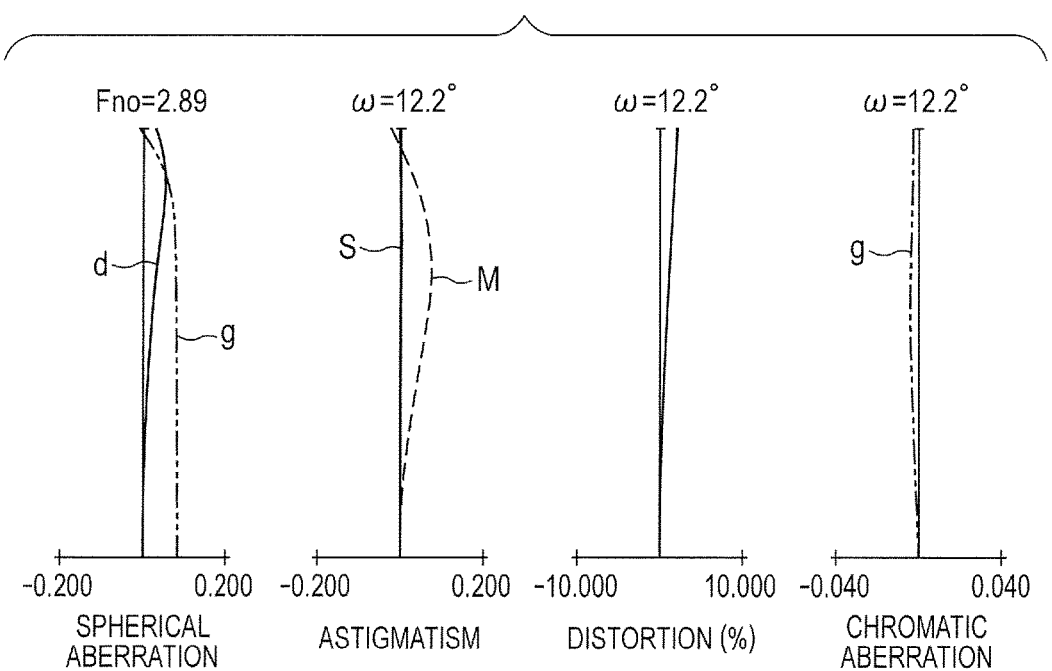
FIG. 2B is a longitudinal aberration diagram when the focusing is made on the infinity object at a telephoto end of the zoom lens of Example 1.

FIG. 1 is a lens cross-sectional view when focusing is made at infinity at a wide angle end (short focal length end) of a zoom lens of Example 1 of the present invention. FIG. 2A and FIG. 2B are longitudinal aberration diagrams when the focusing is made at the infinity at the wide angle end and when the focusing is made at the infinity at a telephoto end (long focal length end) of the zoom lens of Example 1. FIG. 3A and FIG. 3B are longitudinal aberration diagrams when the focusing is made on a close distance (0.1 m) at the wide angle end and when the focusing is made at a close distance (0.5 m) at the telephoto end of the zoom lens of Example 1.

Figure 4:
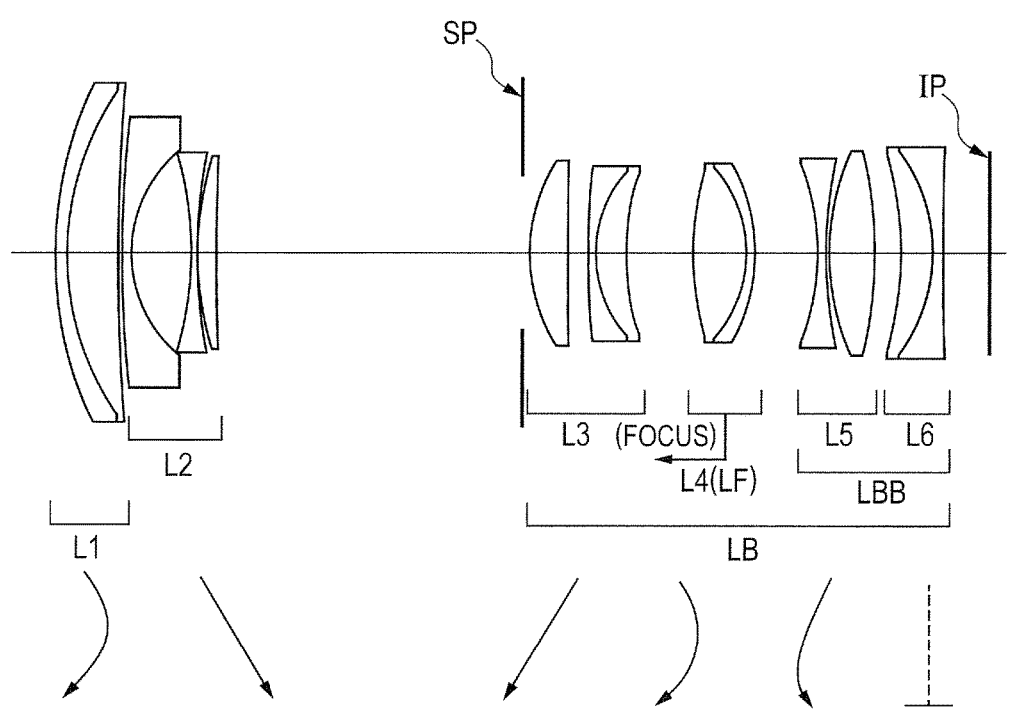
FIG. 4 is a lens cross-sectional view when focusing is made on an infinity object at a wide angle end of a zoom lens according to Example 2 of the present invention.
Figure 5A:
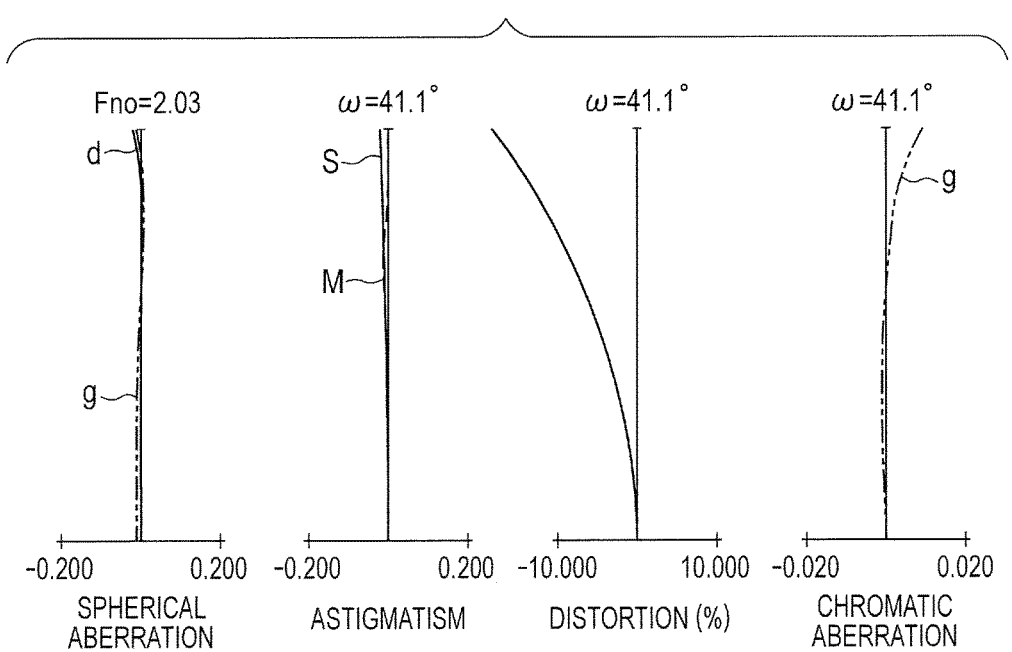
FIG. 5A is a longitudinal aberration diagram when the focusing is made on the infinity object at the wide angle end of the zoom lens of Example 2.
Figure 5B:
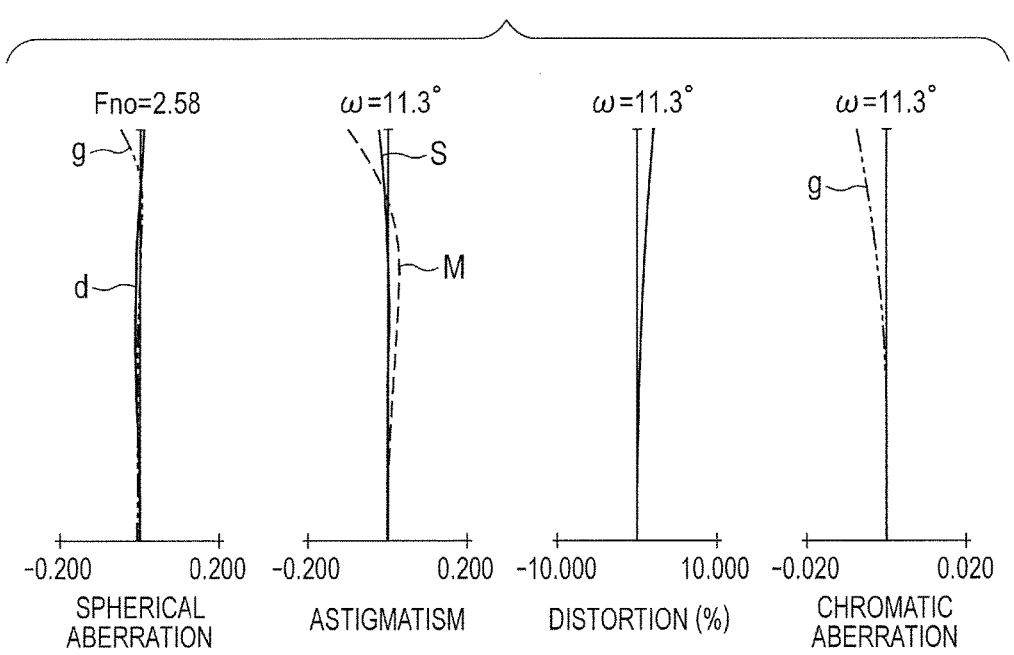
FIG. 5B is a longitudinal aberration diagram when the focusing is made on the infinity object at a telephoto end of the zoom lens of Example 2.
Figure 6A:
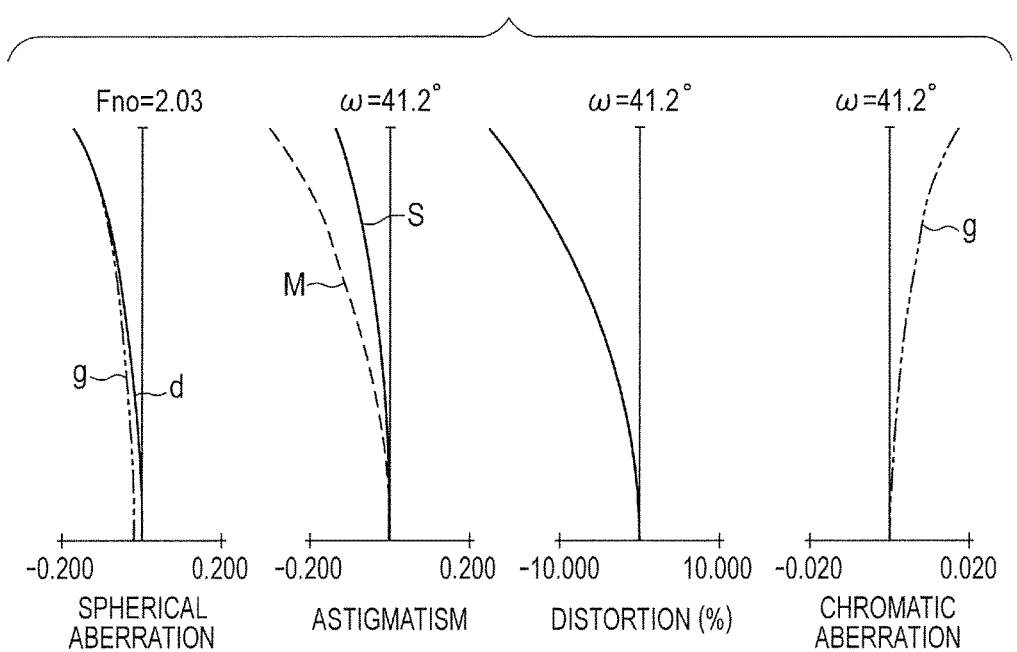
FIG. 6A is a longitudinal aberration diagram when the focusing is made on an object distance of 0.10 m at the wide angle end of the zoom lens of Example 2.
Figure 6B:
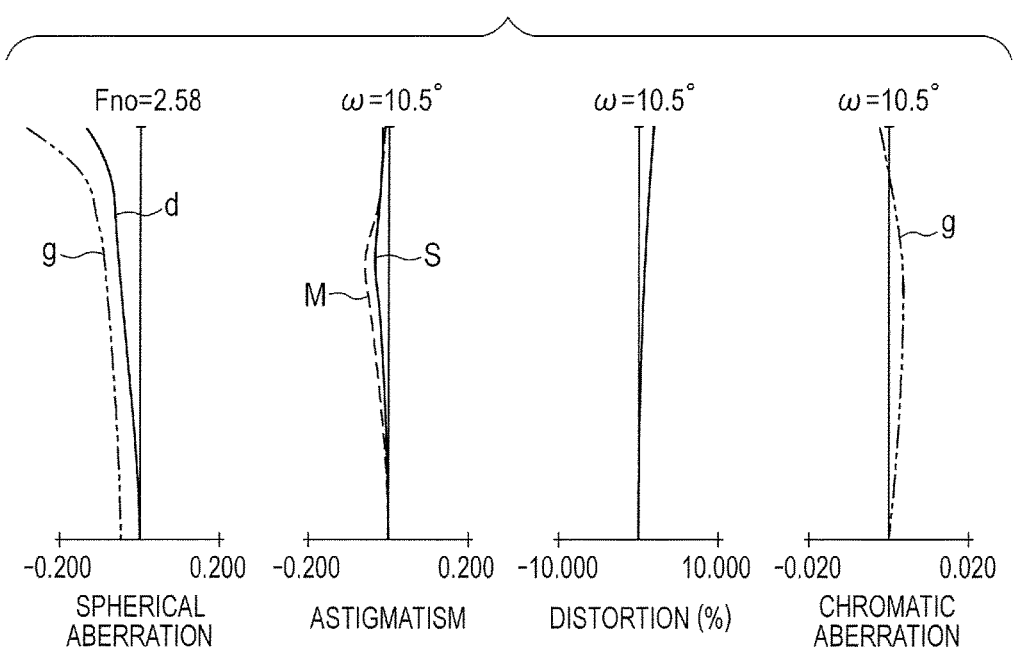
FIG. 6B is a longitudinal aberration diagram when the focusing is made on an object distance of 0.50 m at the telephoto end of the zoom lens of Example 2.

FIG. 4 is a lens cross-sectional view when focusing is made at infinity at a wide angle end of a zoom lens of Example 2 of the present invention. FIG. 5A and FIG. 5B are longitudinal aberration diagrams when the focusing is made at the infinity at the wide angle end and when the focusing is made at the infinity at a telephoto end of the zoom lens of Example 2. FIG. 6A and FIG. 6B are longitudinal aberration diagrams when the focusing is made at a close distance (0.1 m) at the wide angle end and when the focusing is made at a close distance (0.5 m) at the telephoto end of the zoom lens of Example 2.

Figure 7:
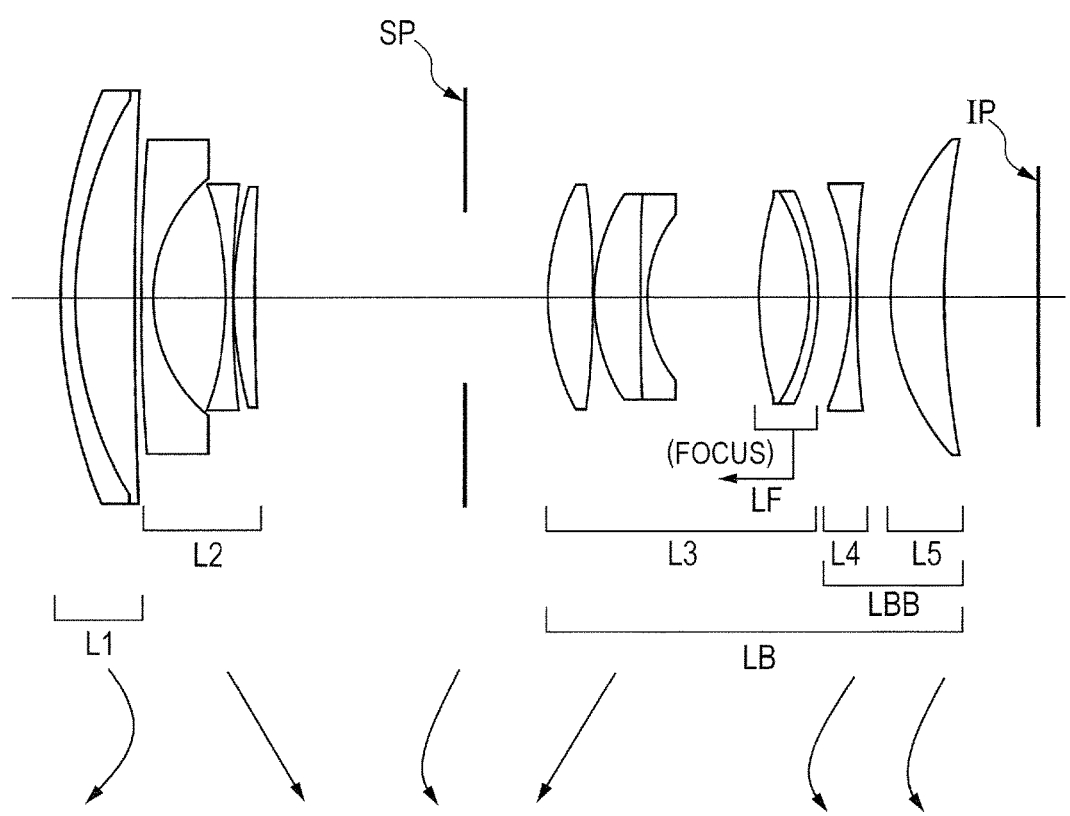
FIG. 7 is a lens cross-sectional view when focusing is made on an infinity object at a wide angle end of a zoom lens according to Example 3 of the present invention.
Figure 8A:
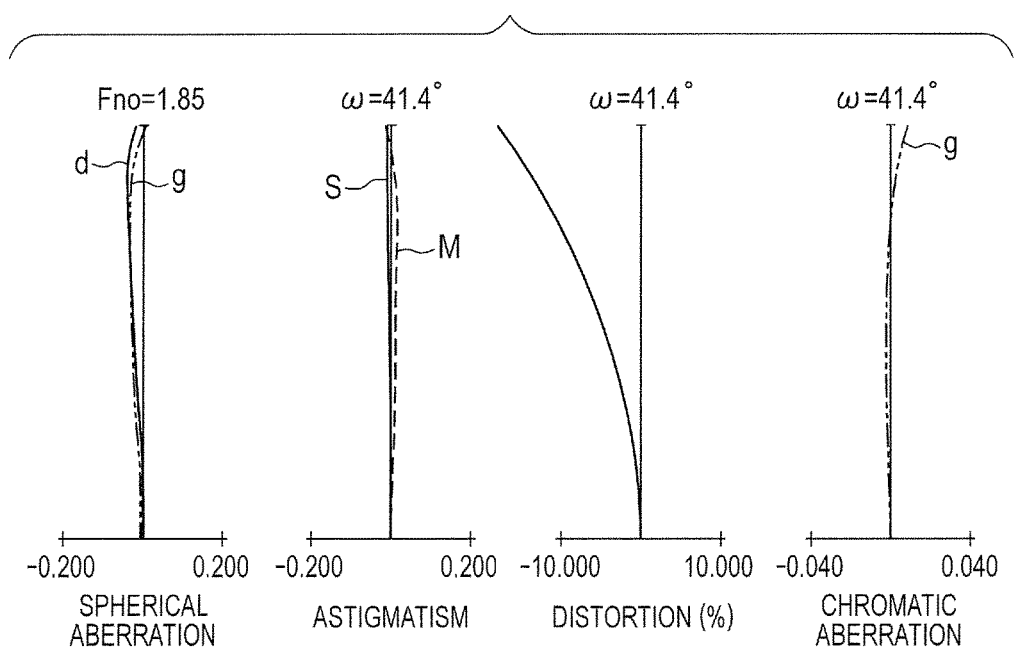
FIG. 8A is a longitudinal aberration diagram when the focusing is made on the infinity object at the wide angle end of the zoom lens of Example 3.
Figure 8B:
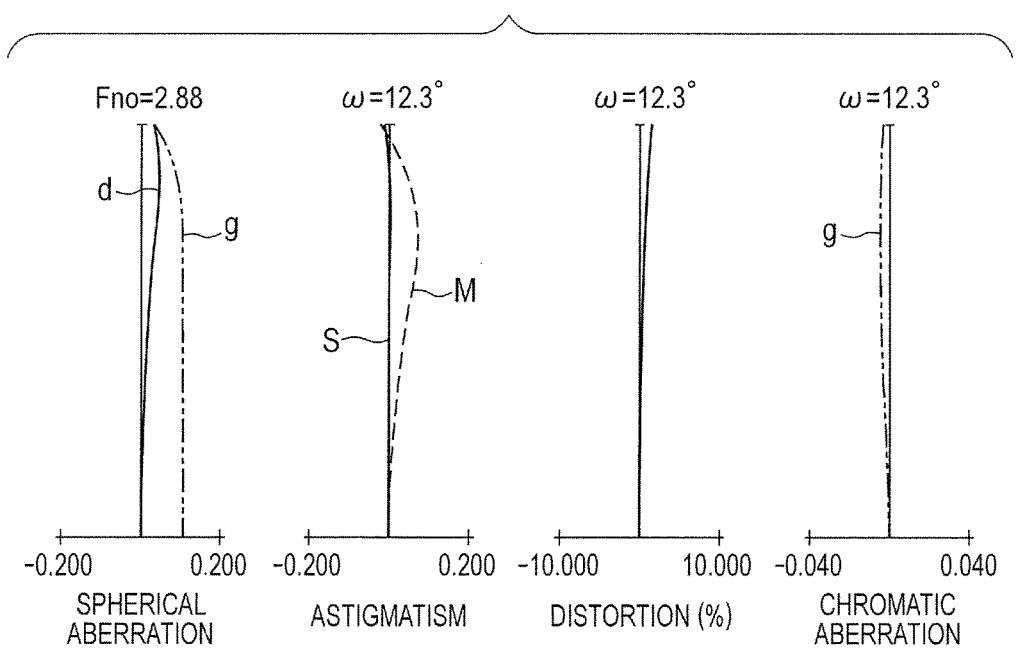
FIG. 8B is a longitudinal aberration diagram when the focusing is made on the infinity object at a telephoto end of the zoom lens of Example 3.
Figure 9A:
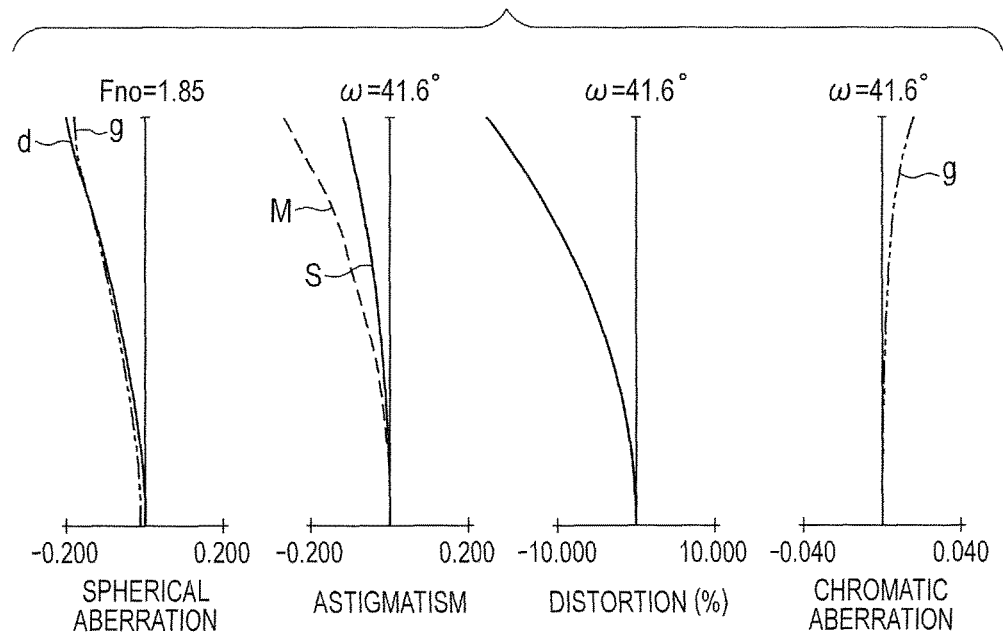
FIG. 9A is a longitudinal aberration diagram when the focusing is made on an object distance of 0.10 m at the wide angle end of the zoom lens of Example 3.
Figure 9B:
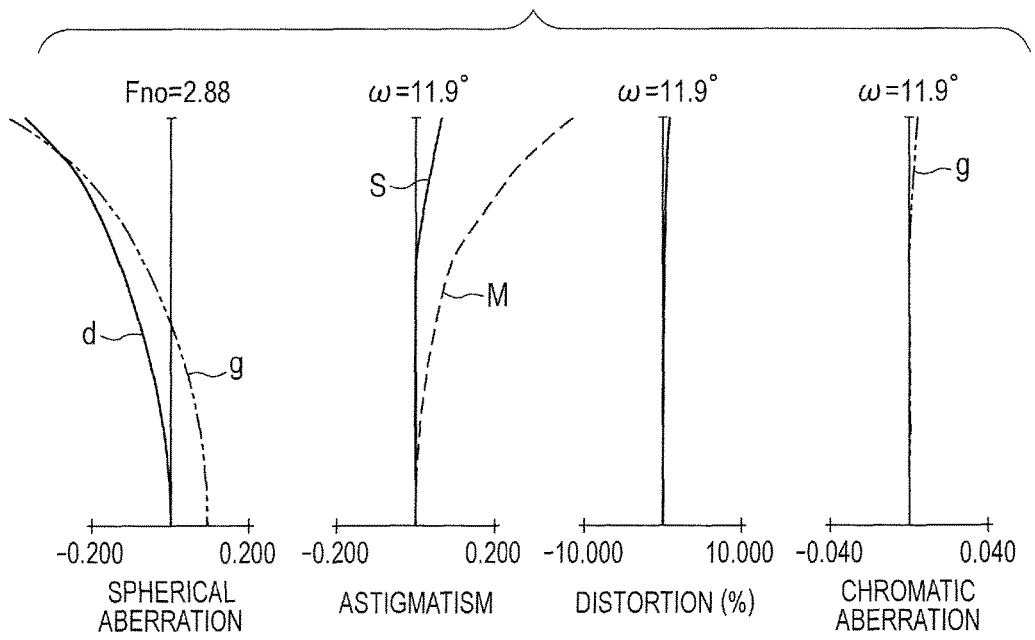
FIG. 9B is a longitudinal aberration diagram when the focusing is made on an object distance of 0.50 m at the telephoto end of the zoom lens of Example 3.

FIG. 7 is a lens cross-sectional view when focusing is made at infinity at a wide angle end of a zoom lens of Example 3 of the present invention. FIG. 8A and FIG. 8B are longitudinal aberration diagrams when the focusing is made at the infinity at the wide angle end and when the focusing is made at the infinity at a telephoto end of the zoom lens of Example 3. FIG. 9A and FIG. 9B are longitudinal aberration diagrams when the focusing is made at a close distance (0.1 m) at the wide angle end and when the focusing is made at a close distance (0.5 m) at the telephoto end of the zoom lens of Example 3.

Figure 10:
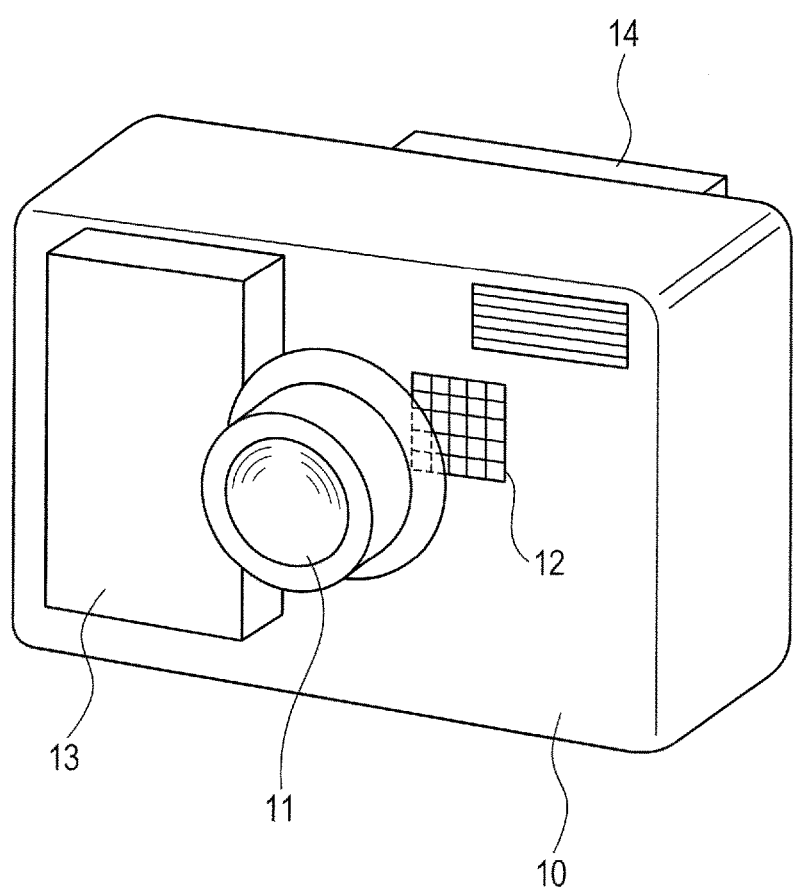
FIG. 10 is a schematic view of a main part of a camera (image pickup apparatus) including an optical system of the present invention.

FIG. 10 is a schematic view of a main part of a camera (image pickup apparatus) including the zoom lens of the present invention. The zoom lens of each of Examples is an image pickup optical system which is to be used in an image pickup apparatus such as a video camera, a digital camera, and a silver-halide film camera. In the lens cross-sectional view, the left side is the object side (front side), and the right side is the image side (rear side). In the lens cross-sectional views, an order of a lens unit from the object side is denoted by i, and an i-th lens unit is denoted by Li. A rear unit LB includes a plurality of lens units and has a positive refractive power as a whole. The rear unit LB includes a focus unit LF having a positive refractive power, which is configured to move during focusing.

An aperture stop SP is arranged on the object side of a third lens unit L3.

On an image plane IP, an image pickup plane of a solid-state image pickup element (photo-electric conversion element) such as a CCD sensor or a CMOS sensor is put when the zoom lens of the present invention is used as a photographing optical system of a video camera or a digital still camera, and a photosensitive surface corresponding to a film surface is put when the zoom lens of the present invention is used for a silver-halide film camera. In the lens cross-sectional views, the arrows indicate loci of movements of the lens units during zooming from the wide angle end to the telephoto end. The arrow regarding focus indicates a movement direction of the focus unit LF during focusing from the infinity to close distance.

In the lens cross-sectional view of FIG. 1, a first lens unit L1 has a positive refractive power, and a second lens unit L2 has a negative refractive power. The rear unit LB consists of a third lens unit L3 having a positive refractive power, a fourth lens unit L4 having a positive refractive power, and a fifth lens unit L5 having a negative refractive power. The fourth lens unit L4 is the focus unit LF.

In Example 1 of FIG. 1, the first lens unit L1 is configured to move along a locus that is convex toward an image side during zooming from the wide angle end to the telephoto end. The second lens unit L2 is configured to move toward the image side while increasing an interval with respect to the first lens unit L1. The third lens unit L3 is configured to move toward the object side while decreasing an interval with respect to the second lens unit L2. The fourth lens unit L4 is configured to move toward the object side while decreasing an interval with respect to the third lens unit L3. The fifth lens unit L5 is configured to move along a locus that is convex toward the object side. The aperture stop SP is configured to move along a locus that is convex toward the object side.

In the lens cross-sectional view of FIG. 4, a first lens unit L1 has a positive refractive power, and a second lens unit L2 has a negative refractive power. The rear unit LB consists of a third lens unit L3 having a positive refractive power, a fourth lens unit L4 having a positive refractive power, a fifth lens unit L5 having a positive refractive power, and a sixth lens unit L6 having a negative refractive power. The fourth lens unit L4 is the focus unit LF.

In Example 2 of FIG. 4, the first lens unit L1 is configured to move along a locus that is convex toward the image side during zooming from the wide angle end to the telephoto end. The second lens unit L2 is configured to move toward the image side while increasing an interval with respect to the first lens unit L1. The third lens unit L3 is configured to move toward the object side while decreasing an interval with respect to the second lens unit L2. The fourth lens unit L4 is configured to move along a locus that is convex toward the image side. The fifth lens unit L5 is configured to move along a locus that is convex toward the object side. The sixth lens unit L6 is configured not to move. The aperture stop SP is configured to move integrally with the third lens unit L3.

In the lens cross-sectional view of FIG. 7, a first lens unit L1 has a positive refractive power, and a second lens unit L2 has a negative refractive power. The rear unit LB consists of a third lens unit L3 having a positive refractive power, a fourth lens unit L4 having a negative refractive power, and a fifth lens unit L5 having a positive refractive power. The focus unit LF consists of a part of the lens system of the third lens unit L3.

In Example 3 of FIG. 7, the first lens unit L1 is configured to move along a locus that is convex toward the image side during zooming from the wide angle end to the telephoto end. The second lens unit L2 is configured to move toward the image side while increasing an interval with respect to the first lens unit L1. The third lens unit L3 is configured to move toward the object side while decreasing an interval with respect to the second lens unit L2. The fourth lens unit L4 is configured to move along a locus that is convex toward the object side. The fifth lens unit L5 is configured to move along a locus that is convex toward the object side. The aperture stop SP is configured to move along a locus that is convex toward the object side.

In the spherical aberration diagrams, a d-line is denoted by d, and a g-line is denoted by g. In the astigmatism diagrams, a meridional image plane is denoted by M, and a sagittal image plane is denoted by S. In the lateral chromatic aberration diagrams, a g-line is denoted by g. A half field angle (degrees) is represented by ω, and an F-number is represented by Fno. Note that, in each of Examples to be described below, the wide angle end and the telephoto end refer to zoom positions when a lens unit for zooming is positioned at both ends of a range in which the lens unit is mechanically movable on an optical axis, respectively. In each of Examples, the focus unit LF or a lens unit including the focus unit LF is configured to move along a locus that is different from those of the other lens units during zooming.

Next, features of each of Examples are described. The zoom lens of the present invention includes, in order from the object side to the image side, the first lens unit L1 having the positive refractive power, the second lens unit L2 having the negative refractive power, and the rear unit LB including at least one lens unit and having the positive refractive power as a whole. In the zoom lens of each of Examples, the rear unit LB includes the focus unit LF having the positive refractive power.

In each of Examples, an inner focus system is adopted as a focus system. In contrast to a front lens focus system in which the first lens unit having a large outer diameter and a heavy weight is moved to perform focusing, in the inner focus system, a lens portion that is small in size and lightweight may be moved to perform focusing. Therefore, the entire lens system is easy to downsize. In addition, a lens portion that is relatively small in size and lightweight is moved to perform focusing, and hence fast focusing becomes easy especially in a camera having an autofocus function.

However, in general, the inner focus system generates a larger variation in aberration during focusing than that generated by the front lens focus system, and has a tendency to increase various aberrations, in particular, spherical aberration when focus is made on a close distance object, in particular.

A positive-lead type zoom lens using the inner focus system has an object of reducing the variation in aberration during the focusing and obtaining a good optical characteristic over an entire object distance while realizing a high zoom ratio and downsizing of the entire lens system. In order to attain this object, in the zoom lens of the present invention, the refractive powers and lens configurations of the lens units, as well as movement conditions accompanying zooming of the lens units are appropriately set. Therefore, the zoom lens of the present invention has a high optical characteristic over an entire zoom range and the entire object distance while realizing the high zoom ratio.

In the zoom lens of the present invention, a focal length of the zoom lens at the telephoto end is represented by ft, and a combined focal length at the telephoto end of an entire optical system arranged on the object side of the focus unit LF is represented by fpt. At this time, the following conditional expression is satisfied:

$$2.0 < |fpt/ft| \quad (1).$$

The conditional expression (1) is intended to reduce variations in various aberrations during focusing over an entire focus range (entire object distance) at the telephoto end, and obtain the high optical characteristic over an entire image plane. The conditional expression (1) is satisfied to reduce an angle of incidence of an axial ray entering the focus unit at the telephoto end. Then, a variation in height of incidence of the axial ray due to focusing may be reduced.

In this manner, variations in axial chromatic aberration and spherical aberration during the focusing are reduced at the telephoto end.

As described above, according to the present invention, the zoom lens having the high optical characteristic over the entire object distance is obtained.

In the zoom lens of each of Examples, it is more preferred to satisfy at least one of conditional expressions below. Then, effects corresponding to the conditional expressions may be obtained. A focal length of the focus unit LF is represented by ff. A combined focal length at the telephoto end of the entire optical system LBB arranged on the image side of the focus unit LF is represented by frt. A lateral magnification of the focus unit LF at the telephoto end is represented by βft. A combined lateral magnification at the telephoto end of the entire optical system LBB arranged on the image side of the focus unit LF is represented by βrt. An interval between the focus unit LF and a lens arranged adjacent to the focus unit LF on the object side at the telephoto end is represented by dft, and a total lens length (distance from the first lens surface to an image plane) at the telephoto end is represented by dt.

Curvature radii of a lens surface closest to the object side and a lens surface closest to the image side of the focus unit LF are represented by r1 and r2, respectively. An F-number of the zoom lens at the telephoto end is represented by Fnot, and a focal length of the zoom lens at the wide angle end is represented by fw. A focal length of the first lens unit L1 is represented by f1. A focal length of the second lens unit L2 is represented by f2.

In addition, when the zoom lens of the present invention is used with an image pickup apparatus including an image pickup element, a maximum value of the height of incidence at which the axial ray and an off-axial ray pass a lens surface closest to the object side of the rear unit LB during zooming from the wide angle end to the telephoto end is represented by hgt. Half a diagonal length of a valid range of the image pickup element is represented by Ymax. Then, it is preferred to satisfy at least one of the following conditional expressions.

$$0.4 < ff/ft < 1.0 \quad (2)$$

$$0.5 < |frt/ft| < 10.0 \quad (3)$$

$$-0.2 < \beta ft < 0.2 \quad (4)$$

$$1.0 < \beta rt < 1.3 \quad (5)$$

$$0.05 < dft/dt < 0.20 \quad (6)$$

$$0.0 < (r1+r2)/(r1-r2) < 0.5 \quad (7)$$

$$0.1 < Fnot/(ft/fw) < 1.0 \quad (8)$$

$$1.0 < f1/ft < 2.0 \quad (9)$$

$$0.8 < |f2/fw| < 1.5 \quad (10)$$

$$0.3 < hgt/(Ymax \times Fnot) < 1.0 \quad (11)$$

Next, technical meanings of the conditional expressions described above are described. The conditional expression (2) is intended to appropriately set the focal length of the focus unit LF and hence obtain the good optical characteristic over the entire object distance while realizing downsizing of the focus unit. When ff/ft exceeds the upper limit of the conditional expression (2), and hence the positive refractive power of the focus unit LF becomes too small, a movement amount during focusing becomes large, and an aberration variation during focusing on the close distance becomes large. When ff/ft falls below the lower limit, and hence the positive refractive power of the focus unit LF becomes too large, the axial chromatic aberration, the spherical aberration, and the like are increased, and those various aberrations become difficult to correct.

The conditional expression (3) is intended to appropriately set the combined focal length frt at the telephoto end of the entire optical system LBB arranged on the image side of the focus unit LF. The conditional expression (3) is satisfied to obtain the good optical characteristic while reducing the total lens length at the telephoto end. When |frt/ft| exceeds the upper limit of the conditional expression (3), and hence the negative refractive power of the entire optical system LBB arranged on the image side of the focus unit LF becomes too small (more specifically, an absolute value of the negative refractive power becomes too small), it becomes difficult to reduce the total lens length at the telephoto end. In addition, the lateral magnification of the entire optical system LBB arranged on the image side of the focus unit LF becomes small at the telephoto end, with the result that the movement amount of the focus unit LF during focusing becomes large, and the aberration variation becomes large during focusing on the close distance.

When |frt/ft| falls below the lower limit, and hence the negative refractive power of the entire optical system LBB arranged on the image side of the focus unit LF becomes too large (more specifically, the absolute value of the negative refractive power becomes too large), distortion and field curvature are increased, and those various aberrations become difficult to correct.

A magnification and a focus sensitivity (a ratio of a movement amount of focus to the movement amount of the focus unit) of the focus unit LF may be expressed by the following expression.

$$ES=(1-\beta f^2)\times \beta r^2$$

Provided that: ES represents the focus sensitivity; βf represents the magnification of the focus unit; and βr represents a combined magnification of all the lens units arranged on the image side of the focus unit. It can be seen from the above expression that the focus sensitivity is 0 when an absolute value of the magnification of the focus unit LF is 1, and the focus sensitivity is increased as the absolute value deviates further from 1.

The conditional expression (4) is satisfied to reduce the movement amount during focusing at the telephoto end, and hence it becomes easy to reduce the total lens length at the telephoto end. In addition, the aberration variation during focusing on the close distance object may be reduced. It can be seen from the above-mentioned expression of the focus sensitivity that the focus sensitivity is increased when the combined lateral magnification of the entire optical system LBB arranged on the image side of the focus unit becomes high at the telephoto end.

The conditional expression (5) is satisfied to reduce the movement amount during focusing at the telephoto end, and hence it becomes easy to reduce the total lens length at the telephoto end. In addition, the aberration variation during focusing on the close distance may be reduced.

The conditional expression (6) is intended to realize a reduction in photographable object distance (shortest photographing distance) while realizing the high zoom ratio. When dft/dt exceeds the upper limit of the conditional expression (6), and hence the interval dft between the focus unit LF and the lens arranged adjacent to the focus unit LF on the object side at the telephoto end becomes too wide, the entire system of the zoom lens is increased in size. In addition, the focus unit's share of zooming becomes small. Therefore, it becomes difficult to realize the high zoom ratio. When dft/dt falls below the lower limit of the conditional expression (6), and hence the interval dft between the focus unit LF and the lens arranged adjacent to the focus unit LF on the object side at the telephoto end becomes too narrow, it becomes difficult to secure a sufficient movement amount during focusing, and hence it becomes difficult to reduce the shortest photographing distance.

It is preferred to form the focus unit LF of a single lens unit including a single lens or a cemented lens obtained by cementing a plurality of lenses. Forming the focus unit by the single lens unit makes it easy to reduce the size and weight of the focus unit LF. In addition, a thickness in an optical axis direction may be reduced, and hence it becomes easy to secure a long movement amount during focusing.

The conditional expression (7) is intended to appropriately set a lens shape of the focus unit LF. In the zoom lens, when the distortion is reduced to an allowable range, it becomes easy to satisfactorily suppress the spherical aberration, and hence it becomes easy to reduce a front lens diameter while reducing the number of lenses arranged on the object side of the aperture stop SP. However, when the distortion is reduced too much, a variation in field curvature during focusing is increased, and the variation becomes difficult to reduce.

The conditional expression (7) may be satisfied to make a curvature radius of a convex shape of a lens surface on the image side of the focus unit LF small, and hence to form a shape close to a circle concentric with the aperture stop SP. In this manner, an off-axial ray entering the focus unit LF is allowed to pass without being excessively refracted, with the result that the occurrence of the field curvature is reduced, and the variation in field curvature due to focusing is reduced on a wide angle side.

The conditional expression (8) defines a relationship between the F-number at the telephoto end and a zoom ratio. When Fnot/(ft/fw) falls below the lower limit value of the conditional expression (8), and hence the F-number with respect to the zoom ratio becomes too small, spherical aberration is abundantly generated by the third lens unit L3, which makes it difficult to maintain the high optical characteristic over the entire zoom range. In addition, when Fnot/(ft/fw) exceeds the upper limit value, and hence the F-number with respect to the zoom ratio becomes too large, it becomes difficult to realize the high zoom ratio and the high aperture ratio.

The conditional expression (9) defines the focal length of the first lens unit L1. When f1/ft exceeds the upper limit of the conditional expression (9), a movement amount of the first lens unit L1 during zooming is increased, and the total lens length becomes long at the telephoto end, which is undesirable. In addition, it becomes difficult to downsize the zoom lens. When f1/ft falls below the lower limit of the conditional expression (9), it becomes easy to realize the high zoom ratio. However, the spherical aberration is increased, and the spherical aberration becomes difficult to correct.

The conditional expression (10) defines the focal length of the second lens unit L2. When |f2/fw| exceeds the upper limit of the conditional expression (10), and hence the negative refractive power of the second lens unit becomes weak, it becomes difficult to obtain a retrofocus type power arrangement, and to increase a photographing field angle at the wide angle end.

When $|f2/fw|$ falls below the lower limit of the conditional expression (10), and hence the negative refractive power of the second lens unit L2 becomes strong, it becomes difficult to reduce variations in spherical aberration, lateral chromatic aberration, and the like accompanying zooming. In addition, an action of diverging an axial ray by the second lens unit L2 becomes too strong, which makes it difficult to downsize the rear unit LB.

The conditional expression (11) defines a relationship between a size of the image pickup element when the zoom lens of the present invention is used with the image pickup apparatus, and an effective diameter hgt of a lens closest to the object side of the rear unit LB for the F-number at the telephoto end.

When hgt/(Ymax·Fnot) falls below the lower limit value of the conditional expression (11), and hence the effective diameter of the lens closest to the object side of the rear unit LB becomes too small, it becomes difficult to secure a sufficient effective diameter for the axial ray corresponding to a bright F-number, and hence to realize a high aperture ratio. In addition, when hgt/(Ymax·Fnot) exceeds the upper limit value, and hence the effective diameter of the lens closest to the object side of the rear unit LB becomes too large, spherical aberration is abundantly generated by the lens closest to the object side of the rear unit LB. Such spherical aberration becomes difficult to correct by the entire system of the optical system, and hence it becomes difficult to obtain the high optical characteristic while realizing the high aperture ratio.

It is more preferred to set the numerical value ranges of the above-mentioned conditional expressions (1) to (11) as follows in each of Examples.

$7.0 < |fpt/ft|$ (1a)

$0.5 < ff/ft < 0.8$ (2a)

$1.0 < |frt/ft| < 8.0$ (3a)

$-0.15 < \beta ft < 0.10$ (4a)

$1.10 < \beta rt < 1.25$ (5a)

$0.07 < dft/dt < 0.15$ (6a)

$0.1 < (r1+r2)/(r1-r2) < 0.4$ (7a)

$0.4 < Fnot/(ft/fw) < 0.8$ (8a)

$1.2 < f1/ft < 1.6$ (9a)

$1.0 < |f2/fw| < 1.3$ (10a)

$0.4 < hgt/(Ymax \times Fnot) < 0.8$ (11a)

As described above, according to each of Examples, despite being the zoom lens having the F-number at the telephoto end of 3 or less and the high aperture ratio, the zoom lens including the focus unit that is small in size and lightweight and having the high optical characteristic over the entire zoom range and the entire object distance is obtained.

Numerical Examples 1 to 3 corresponding to Examples 1 to 3 are described below. In each of Numerical Examples, i indicates the order of surfaces from the object side, ri indicates the curvature radius of i-th (i-th surface), di indicates an interval between the i-th surface and the (i+1)th surface, and ndi and vdi indicate the refractive index and Abbe number of a material based on the d-line, respectively. An image height is a highest image height that determines the half field angle. A total lens length is a length from the first lens surface to the image plane. Back focus BF is a length from the final lens surface to the image plane. In aspherical surface data, aspherical surface coefficients in a case where aspherical surfaces are expressed by the following expression are shown.

$$x = \frac{\frac{h^2}{R}}{1 + \sqrt{1 - (1+k)\left(\frac{h}{R}\right)^2}} + A4h^2 + A6h^6 + A8h^8 + A10h^{10}$$ [Equation 1]

Provided that: x represents a displacement amount from a reference surface in the optical axis direction; h represents a height in a direction perpendicular to the optical axis; R represents a radius of a quadratic surface as a base; k represents a conic constant; and An represents an n-th order aspherical surface coefficient. Note that, the notation "e-Z" means "$10^{-Z}$". In addition, correspondence between each of the conditional expressions described above and numerical values in Numerical Examples is shown in Table 1.

Numerical Example 1

| Unit mm | | | | | |
|---|---|---|---|---|---|
| Surface data | | | | | |
| Surface number | r | d | nd | vd | Effective diameter |
| 1 | 32.903 | 0.85 | 1.94595 | 18.0 | 23.11 |
| 2 | 23.697 | 3.39 | 1.80420 | 46.5 | 22.16 |
| 3 | 239.525 | (Variable) | | | 21.67 |
| 4 | 104.318 | 0.67 | 1.77250 | 49.6 | 17.70 |
| 5 | 9.356 | 4.75 | | | 13.33 |
| 6* | −18.059 | 0.40 | 1.76802 | 49.2 | 12.53 |
| 7 | 116.691 | 0.10 | | | 12.34 |
| 8 | 30.603 | 1.20 | 1.95906 | 17.5 | 12.27 |
| 9 | 717.339 | (Variable) | | | 12.12 |
| 10 (Stop) | ∞ | (Variable) | | | 10.62 |
| 11* | 15.470 | 2.65 | 1.76802 | 49.2 | 12.97 |
| 12* | −45.132 | 0.10 | | | 12.82 |
| 13 | 11.775 | 2.52 | 1.83481 | 42.7 | 11.79 |
| 14 | 230.169 | 0.45 | 1.85478 | 24.8 | 11.01 |
| 15 | 8.338 | (Variable) | | | 9.56 |
| 16 | 30.731 | 2.88 | 1.49700 | 81.5 | 11.95 |
| 17 | −17.952 | (Variable) | | | 12.20 |
| 18 | −22.355 | 0.40 | 1.85135 | 40.1 | 12.30 |
| 19* | 444.580 | 0.10 | | | 12.75 |
| 20 | 21.426 | 1.94 | 1.63854 | 55.4 | 13.57 |
| 21 | −542.945 | (Variable) | | | 13.69 |
| Image plane | ∞ | | | | |

| Aspherical surface data |
|---|
| Sixth surface |

K = 0.00000e+000   A4 = −2.29119e−005   A6 = 8.28299e−008
A8 = −1.20260e−008   A10 = 1.04155e−010

Eleventh surface

K = 0.00000e+000   A4 = −4.42389e−005   A6 = 1.20948e−007

Twelfth surface

K = 0.00000e+000   A4 = 1.80026e−005   A6 = 3.00368e−007
A8 = −3.24113e−009   A10 = 2.62387e−011

-continued

| Unit mm |
| --- |

Nineteenth surface

| | | |
| --- | --- | --- |
| K = 0.00000e+000 | A4 = 5.63992e−005 | A6 = −4.35159e−008 |
| A8 = −9.87071e−010 | A10 = 8.77351e−012 | |

Various data
Zoom ratio 3.94

| | Wide angle | Intermediate | Telephoto |
| --- | --- | --- | --- |
| Focal length | 9.06 | 16.39 | 35.69 |
| F-number | 1.85 | 2.54 | 2.88 |
| Half angle of field (degree) | 35.52 | 25.03 | 12.46 |
| Image height | 6.47 | 7.65 | 7.89 |
| Total lens length | 58.97 | 58.94 | 67.77 |
| BF | 8.90 | 13.30 | 12.40 |
| d3 | 0.31 | 4.81 | 15.34 |
| d9 | 12.26 | 3.51 | 0.70 |
| d10 | 5.34 | 4.39 | 0.31 |
| d15 | 8.38 | 7.60 | 6.58 |
| d17 | 1.40 | 2.95 | 10.04 |
| d21 | 8.90 | 13.30 | 12.40 |

Zoom lens unit data

| Unit | First surface | Focal length |
| --- | --- | --- |
| 1 | 1 | 50.83 |
| 2 | 4 | −10.03 |
| 3 | 10 | ∞ |
| 4 | 11 | 17.24 |
| 5 | 16 | 23.26 |
| 6 | 18 | −115.71 |

Numerical Example 2

| Unit mm |
| --- |

Surface data

| Surface number | r | d | nd | vd | Effective diameter |
| --- | --- | --- | --- | --- | --- |
| 1 | 31.460 | 0.90 | 1.95906 | 17.5 | 25.00 |
| 2 | 22.075 | 3.99 | 1.83481 | 42.7 | 23.87 |
| 3 | 173.492 | (Variable) | | | 23.36 |
| 4 | 116.516 | 0.65 | 1.77250 | 49.6 | 19.69 |
| 5 | 10.448 | 4.61 | | | 14.96 |
| 6* | −27.237 | 0.50 | 1.77250 | 49.5 | 14.51 |
| 7 | 37.051 | 0.10 | | | 14.05 |
| 8 | 26.969 | 1.39 | 1.95906 | 17.5 | 14.02 |
| 9 | 179.793 | (Variable) | | | 13.84 |
| 10 (Stop) | ∞ | 0.50 | | | 11.98 |
| 11 | 13.213 | 2.93 | 1.72916 | 54.7 | 13.29 |
| 12 | 398.246 | 1.57 | | | 13.06 |
| 13 | 68.201 | 0.55 | 1.72047 | 34.7 | 12.49 |
| 14 | 9.492 | 2.40 | 1.72903 | 54.0 | 11.88 |
| 15* | 26.465 | (Variable) | | | 11.57 |
| 16 | 25.168 | 4.10 | 1.49700 | 81.5 | 12.04 |
| 17 | −9.923 | 0.65 | 1.83400 | 37.2 | 12.30 |
| 18 | −14.411 | (Variable) | | | 12.86 |
| 19 | −18.511 | 0.65 | 1.74950 | 35.3 | 12.86 |
| 20 | 34.889 | 0.20 | | | 13.64 |
| 21* | 16.937 | 3.54 | 1.77250 | 49.5 | 14.62 |
| 22 | −33.704 | (Variable) | | | 14.75 |
| 23 | −27.553 | 2.46 | 1.84666 | 23.9 | 14.62 |
| 24 | −13.171 | 0.75 | 1.76200 | 40.1 | 14.82 |
| 25 | 166.770 | 3.57 | | | 15.17 |
| Image plane | ∞ | | | | |

-continued

| Unit mm |
| --- |

Aspherical surface data

Sixth surface

| | | |
| --- | --- | --- |
| K = 0.00000e+000 | A4 = −6.41140e−006 | A6 = 5.57684e−008 |
| A8 = −3.27125e−009 | A10 = 1.93183e−011 | |

Fifteenth surface

| | | |
| --- | --- | --- |
| K = 0.00000e+000 | A4 = 1.38941e−004 | A6 = 8.79835e−007 |
| A8 = −6.39494e−010 | A10 = 1.22023e−010 | |

Twenty-first surface

| | | |
| --- | --- | --- |
| K = 0.00000e+000 | A4 = −6.11525e−005 | A6 = 3.48246e−008 |
| A8 = 1.95888e−009 | A10 = −2.03717e−011 | |

Various data
Zoom ratio 4.27

| | Wide angle | Intermediate | Telephoto |
| --- | --- | --- | --- |
| Focal length | 9.09 | 12.48 | 38.79 |
| F-number | 2.03 | 2.17 | 2.58 |
| Half angle of field (degree) | 35.45 | 31.51 | 11.50 |
| Image height | 6.47 | 7.65 | 7.89 |
| Total lens length | 72.07 | 66.52 | 75.94 |
| BF | 3.57 | 3.57 | 3.57 |
| d3 | 0.31 | 0.31 | 14.87 |
| d9 | 23.66 | 14.05 | 1.13 |
| d15 | 5.18 | 6.19 | 5.97 |
| d18 | 4.89 | 5.22 | 16.98 |
| d22 | 2.02 | 4.74 | 0.99 |

Zoom lens unit data

| Unit | First surface | Focal length |
| --- | --- | --- |
| 1 | 1 | 48.90 |
| 2 | 4 | −10.92 |
| 3 | 10 | 23.13 |
| 4 | 16 | 23.46 |
| 5 | 19 | 113.50 |
| 6 | 23 | −34.67 |

Numerical Example 3

| Unit mm |
| --- |

Surface data

| Surface number | r | d | nd | vd | Effective diameter |
| --- | --- | --- | --- | --- | --- |
| 1 | 31.934 | 0.85 | 1.94595 | 18.0 | 23.70 |
| 2 | 22.698 | 3.67 | 1.80420 | 46.5 | 22.34 |
| 3 | 348.686 | (Variable) | | | 21.82 |
| 4 | 175.944 | 0.67 | 1.77250 | 49.6 | 17.80 |
| 5 | 9.254 | 4.41 | | | 13.28 |
| 6* | −21.749 | 0.40 | 1.76802 | 49.2 | 12.69 |
| 7 | 63.771 | 0.10 | | | 12.40 |
| 8 | 25.588 | 1.26 | 1.95906 | 17.5 | 12.32 |
| 9 | 168.719 | (Variable) | | | 12.12 |
| 10 (Stop) | ∞ | (Variable) | | | 10.38 |
| 11* | 14.229 | 2.65 | 1.76802 | 49.2 | 12.65 |
| 12* | −55.682 | 0.10 | | | 12.46 |
| 13 | 11.636 | 2.75 | 1.83481 | 42.7 | 11.49 |
| 14 | 133.910 | 0.45 | 1.85478 | 24.8 | 10.45 |
| 15 | 7.809 | 6.72 | | | 9.06 |
| 16 | 22.304 | 3.06 | 1.49700 | 81.5 | 11.26 |
| 17 | −11.703 | 0.50 | 1.83481 | 42.7 | 11.49 |
| 18 | −14.998 | (Variable) | | | 11.83 |

-continued

Unit mm

| | | | | | |
|---|---|---|---|---|---|
| 19 | −17.579 | 0.40 | 1.61405 | 55.0 | 12.11 |
| 20* | 97.749 | (Variable) | | | 12.69 |
| 21 | 14.270 | 3.26 | 1.59522 | 67.7 | 17.93 |
| 22 | 49.886 | (Variable) | | | 17.71 |
| Image plane | ∞ | | | | |

Aspherical surface data

Sixth surface

K = 0.00000e+000   A4 = −1.78427e−005   A6 = 2.76169e−007
A8 = −1.51025e−008   A10 = 1.40169e−010

Eleventh surface

K = 0.00000e+000   A4 = −4.64998e−005   A6 = 8.46809e−008

Twelfth surface

K = 0.00000e+000   A4 = 1.88687e−005   A6 = 3.63173e−007
A8 = −4.92636e−009   A10 = 4.58148e−011

Twentieth surface

K = 0.00000e+000   A4 = 7.29286e−005   A6 = −8.35581e−008
A8 = −9.38328e−009   A10 = 7.56034e−011

Various data
Zoom ratio 3.94

| | Wide angle | Intermediate | Telephoto |
|---|---|---|---|
| Focal length | 9.06 | 15.73 | 35.70 |
| F-number | 1.85 | 2.54 | 2.88 |
| Half angle of field (degree) | 35.52 | 25.94 | 12.46 |
| Image height | 6.47 | 7.65 | 7.89 |
| Total lens length | 58.91 | 59.27 | 67.86 |
| BF | 5.63 | 8.46 | 6.94 |
| d3 | 0.37 | 4.13 | 14.63 |
| d9 | 12.59 | 2.95 | 0.70 |
| d10 | 5.10 | 5.98 | 0.94 |
| d18 | 1.94 | 3.04 | 8.33 |
| d20 | 2.03 | 3.48 | 5.09 |
| d22 | 5.63 | 8.46 | 6.94 |

Zoom lens unit data

| Unit | First surface | Focal length |
|---|---|---|
| 1 | 1 | 46.97 |
| 2 | 4 | −10.08 |
| 3 | 10 | ∞ |
| 4 | 11 | 14.78 |
| 5 | 19 | −24.23 |
| 6 | 21 | 32.47 |

TABLE 1

| | Conditional Expressions | Example 1 | Example 2 | Example 3 |
|---|---|---|---|---|
| (1) | \|fpt/ft\| | 61.63 | 8.68 | 15.05 |
| (2) | ff/ft | 0.65 | 0.60 | 0.58 |
| (3) | \|frt/ft\| | 3.24 | 1.20 | 5.91 |
| (4) | βft | 0.01 | −0.10 | 0.05 |
| (5) | βrt | 1.13 | 1.16 | 1.23 |
| (6) | dft/dt | 0.12 | 0.08 | 0.10 |
| (7) | (r1 + r2)/(r1 − r2) | 0.26 | 0.27 | 0.20 |
| (8) | Fnot/(ft/fw) | 0.73 | 0.60 | 0.73 |
| (9) | f1/ft | 1.42 | 1.26 | 1.32 |
| (10) | \|f2/fw\| | 1.11 | 1.20 | 1.11 |
| (11) | hgt/(Ymax × Fnot) | 0.57 | 0.65 | 0.56 |

Next, Example in which the zoom lens of the present invention is used as a photographing optical system is described with reference to FIG. 10. FIG. 10 is an illustration of an example of an image pickup apparatus 10 that includes a photographing optical system 11 including the zoom lens of the present invention, and an image pickup element (photo-electric conversion element) 12 such as a CCD sensor or a CMOS sensor configured to receive light of a subject image formed by the photographing optical system 11. In addition, the image pickup apparatus 10 includes a recording unit 13 records the subject image received by the image pickup element 12, and a viewfinder 14 for observing the subject image displayed on a display element (not shown). The display element is formed of a liquid crystal panel or the like, and displays the subject image formed on the image pickup element 12.

In this manner, the zoom lens of the present invention may be applied to an optical instrument such as a digital camera to realize an optical instrument having the high optical characteristic. Note that, the present invention may equally be applied to a single lens reflex (SLR) camera without a quick return mirror. Note that, the zoom lens of the present invention may equally be applied to a video camera.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-173918, filed Aug. 28, 2014, which is hereby incorporated by reference herein in its entirety.

What is claimed is:

1. A zoom lens, comprising, in order from an object side to an image side:
    a first lens unit having a positive refractive power;
    a second lens unit having a negative refractive power; and
    a rear unit comprising a plurality of lens units and having a positive refractive power as a whole,
    wherein an interval between all adjacent lens units is changed during zooming,
    wherein the rear unit comprises a focus unit having a positive refractive power, which is configured to move during focusing, and an optical system being all lenses arranged on the image side of the focus unit having a negative refractive power at a telephoto end, the optical system not moving for focusing,
    wherein the first lens unit is configured to move toward the object side after moving toward the image side during zooming from a wide angle end to the telephoto end, and
    wherein the following conditional expressions are satisfied:

$2.0 < |fpt/ft|$, and $0.20 \leq (r1+r2)/(r1-r2) < 0.5$, where ft represents a focal length of the zoom lens at the telephoto end, fpt represents a combined focal length at the telephoto end of an optical system being all lenses arranged on the object side of the focus unit, r1 represents a curvature radius of a lens surface closest to the object side of the focus unit, and r2 represents a curvature radius of a lens surface closest to the image side of the focus unit.

2. A zoom lens according to claim 1, wherein the following conditional expression is satisfied:

$0.4 < ff/ft < 1.0$, where ff represents a focal length of the focus unit.

3. A zoom lens according to claim 1, wherein the following conditional expression is satisfied:

$0.5 < |frt/ft| < 10.0$, where frt represents a combined focal length of the optical system arranged on the image side of the focus unit at the telephoto end.

4. A zoom lens according to claim 1, wherein the following conditional expression is satisfied:

$$-0.2<\beta ft<0.2,$$

where βft represents a lateral magnification of the focus unit at the telephoto end.

5. A zoom lens according to claim 1, wherein the following conditional expression is satisfied:

$$1.0<\beta rt<1.3,$$

where βrt represents a combined lateral magnification of the optical system arranged on the image side of the focus unit at the telephoto end.

6. A zoom lens according to claim 1, wherein the following conditional expression is satisfied:

$$0.05<dft/dt<0.20,$$

where dft represents an interval between the focus unit and a lens arranged adjacent to the focus unit on the object side at the telephoto end, and dt represents a distance from the most object side lens surface of the zoom lens to an image plane of the zoom lens at the telephoto end.

7. A zoom lens according to claim 1, wherein the focus unit is formed of a single lens or a cemented lens obtained by cementing a plurality of lenses.

8. A zoom lens according to claim 1, wherein the following conditional expression is satisfied:

$$0.1<Fnot/(ft/fw)<1.0,$$

where Fnot represents an F-number of an entire system of the zoom lens at the telephoto end, and fw represents a focal length of the zoom lens at a wide angle end.

9. A zoom lens according to claim 1, wherein the following conditional expression is satisfied:

$$1.0<f1/ft<2.0,$$

where f1 represents a focal length of the first lens unit.

10. A zoom lens according to claim 1, wherein the following conditional expression is satisfied:

$$0.8 \leq |f2/fw|<1.5,$$

where f2 represents a focal length of the second lens unit, and fw represents a focal length of the zoom lens at a wide angle end.

11. A zoom lens according to claim 1, wherein the focus unit is configured to move along a locus that is different from loci of other lens units during zooming.

12. A zoom lens according to claim 1, wherein the rear unit consists of, in order from the object side to the image side, a third lens unit having a positive refractive power, a fourth lens unit having a positive refractive power, and a fifth lens unit having a negative refractive power.

13. A zoom lens according to claim 1, wherein the rear unit consists of, in order from the object side to the image side, a third lens unit having a positive refractive power, a fourth lens unit having a positive refractive power, a fifth lens unit having a positive refractive power, and a sixth lens unit having a negative refractive power.

14. A zoom lens according to claim 1, wherein the rear unit consists of, in order from the object side to the image side, a third lens unit having a positive refractive power, a fourth lens unit having a negative refractive power, and a fifth lens unit having a positive refractive power.

15. A zoom lens according to claim 1, which is configured to form an image on a solid-state image pickup element.

16. An image pickup apparatus, comprising:
the zoom lens according to claim 1; and
an image pickup element configured to receive an image formed by the zoom lens.

17. An image pickup apparatus according to claim 16, wherein the following conditional expression is satisfied:

$$0.3<hgt/(Ymax \times Fnot)<1.0,$$

where Fnot represents an F-number of the zoom lens at the telephoto end, hgt represents a maximum value of a height of incidence of one having a highest height of incidence of an axial ray and an off-axial ray entering a lens surface closest to the object side of the rear unit, and Ymax represents half a diagonal length of a valid range of the image pickup element.

18. A zoom lens according to claim 1, wherein the second lens unit is configured to monotonically move toward the image side during zooming from the wide angle end to the telephoto end.

19. A zoom lens according to claim 1, wherein a lens unit arranged adjacent to the image side of the focus unit moves toward the image side after moving toward the object side during zooming from the wide angle end to the telephoto end.

20. A zoom lens according to claim 1, wherein a plurality of lens units included in the zoom lens consist of the first lens unit, the second lens unit, a third lens unit having a positive refractive power, a fourth lens unit having a positive refractive power, and a fifth lens unit having a negative refractive power arranged in order from the object side to the image side.

21. A zoom lens, comprising, in order from an object side to an image side:
a first lens unit having a positive refractive power;
a second lens unit having a negative refractive power; and
a rear unit having a positive refractive power as a whole, and consisting of, in order from the object side to the image side, a third lens unit having a positive refractive power, a fourth lens unit having a negative refractive power, and a fifth lens unit having a positive refractive power,
wherein an interval between all adjacent lens units is changed during zooming,
wherein the rear unit comprises a focus unit having a positive refractive power, which is configured to move during focusing, and an optical system being all lenses arranged on the image side of the focus unit having a negative refractive power at a telephoto end, the optical system not moving for focusing,
wherein the first lens unit is configured to move toward the object side after moving toward the image side during zooming from a wide angle end to the telephoto end, and
wherein the following conditional expression is satisfied:

$$2.0<|fpt/ft|,$$

where ft represents a focal length of the zoom lens at the telephoto end, and fpt represents a combined focal length at the telephoto end of an optical system being all lenses arranged on the object side of the focus unit.

22. A zoom lens, comprising, in order from an object side to an image side:
a first lens unit having a positive refractive power;
a second lens unit having a negative refractive power; and
a rear unit comprising a plurality of lens units and having a positive refractive power as a whole, wherein an interval between all adjacent lens units is changed during zooming, wherein the rear unit comprises a focus unit having a positive refractive power, which is configured to move during focusing, and an optical system being all lenses arranged on the image side of the focus unit having a negative refractive power at a telephoto end, the optical system not moving for focusing, wherein the first lens unit is configured to move toward the object side after moving toward the image side during zooming from a wide angle end to the telephoto end, and wherein the following conditional expressions are satisfied:

$2.0 < |fpt/ft|$, and $0.08 \leq dft/dt < 0.20$, where ft represents a focal length of the zoom lens at the telephoto end, fpt represents a combined focal length at the telephoto end of an optical system being all lenses arranged on the object side of the focus unit, dft represents an interval between the focus unit and a lens arranged adjacent to the focus unit on the object side at the telephoto end, and dt represents a distance from the most object side lens surface of the zoom lens to an image plane of the zoom lens at the telephoto end.

23. A zoom lens, consisting of, in order from an object side to an image side:

a first lens unit having a positive refractive power;

a second lens unit having a negative refractive power; and a rear unit having a positive refractive power as a whole and consisting of, in order from the object side to the image side, a third lens unit having a positive refractive power, a fourth lens unit having a positive refractive power, and a fifth lens unit having a negative refractive power, wherein an interval between all adjacent lens units is changed during zooming, wherein the rear unit comprises a focus unit having a positive refractive power, which is configured to move during focusing, and an optical system being all lenses arranged on the image side of the focus unit having a negative refractive power at a telephoto end, the optical system not moving for focusing, wherein the first lens unit is configured to move toward the object side after moving toward the image side during zooming from a wide angle end to the telephoto end, and wherein the following conditional expression is satisfied:

$2.0 < |fpt/ft|$, where ft represents a focal length of the zoom lens at the telephoto end, and fpt represents a combined focal length at the telephoto end of an optical system being all lenses arranged on the object side of the focus unit.

* * * * *